United States Patent
Liljegren et al.

(10) Patent No.: US 9,664,577 B1
(45) Date of Patent: May 30, 2017

(54) FORCE-SENSITIVE RESISTOR ASSEMBLIES AND METHODS

(71) Applicant: Amazon Technologies, Inc., Reno, NV (US)

(72) Inventors: Edward Albert Liljegren, San Francisco, CA (US); Angeles Marcia Almanza-Workman, Sunnyvale, CA (US); Anna Kim Lee, San Francisco, CA (US); Robert Olson, Sunnyvale, CA (US); Jung Sik Yang, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 14/469,436

(22) Filed: Aug. 26, 2014

(51) Int. Cl.
| | |
|---|---|
| *G01L 1/00* | (2006.01) |
| *G01L 1/22* | (2006.01) |
| *G06F 3/041* | (2006.01) |
| *G06F 3/045* | (2006.01) |

(52) U.S. Cl.
CPC ............ *G01L 1/2287* (2013.01); *G06F 3/045* (2013.01); *G06F 3/0412* (2013.01)

(58) Field of Classification Search
CPC ............... G06F 3/0418; G06F 3/0414; G06F 2203/04103; G06F 3/0428; G06F 2203/04105; G06F 3/0416; G06F 3/0433; G06F 3/0233; G06F 3/04883; G06F 2203/04808; G06F 3/0237; G06F 3/045; G01L 1/22; G01L 1/2287; G01L 25/00; G01D 18/006

USPC .................. 73/777, 31.06; 345/173-174
See application file for complete search history.

(56) References Cited

U.S. PATENT DOCUMENTS

| | | | |
|---|---|---|---|
| 7,113,179 B2 | 9/2006 | Baker et al. | |
| 2007/0295534 A1* | 12/2007 | Ishii ................... | G11B 5/486 174/261 |
| 2013/0278542 A1* | 10/2013 | Stephanou ............ | G06F 3/0414 345/174 |
| 2014/0042001 A1* | 2/2014 | Wang ................. | H03K 17/9618 200/295 |

OTHER PUBLICATIONS

U.S. Appl. No. 13/792,481, filed Mar. 11, 2013, Primary Inventor: Ilya Daniel Rosenberg.
U.S. Appl. No. 14/038,307, filed Sep. 26, 2013, Primary Inventor: John Aaron Zarraga.

* cited by examiner

*Primary Examiner* — Harshad R Patel
*Assistant Examiner* — Brandi Hopkins
(74) *Attorney, Agent, or Firm* — Lee & Hayes, PLLC

(57) ABSTRACT

A force-sensitive resistor (FSR) assembly includes first and second electrically insulative substrates. The first substrate includes a first top surface and a first bottom surface. The second substrate includes a second top surface and a second bottom surface. The first substrate is positioned such that the first bottom surface is disposed facing the second top surface. The FSR assembly also includes thermoset ink disposed between the first substrate and the second substrate.

20 Claims, 7 Drawing Sheets

FORCE-SENSITIVE RESISTOR ASSEMBLIES AND METHODS

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. Such devices typically include one or more displays and one or more touch or force sensors configured to receive input from the user. For example, such sensors may include a force-sensitive resistor (FSR) assembly configured to change resistance in a predictable manner in response to the application of force, such as a force associated with touch input from the user.

Although FSR assemblies are used in a wide range of applications, such assemblies can be difficult to manufacture. For instance, FSR assemblies typically include a pair of flexible substrates. During manufacture, force-sensitive ink or other like materials are disposed on each of the substrates, and the substrates are then exposed to elevated temperatures in order to cure the ink. Such elevated temperatures, however, can cause deformation of the substrates, thus resulting in poor sensor performance and reliability. While, in some instances, inks having relatively low curing temperatures may be used, it can be difficult to reliably adhere such inks to known substrates. Additionally, such inks are prone to re-flowing at elevated temperatures.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
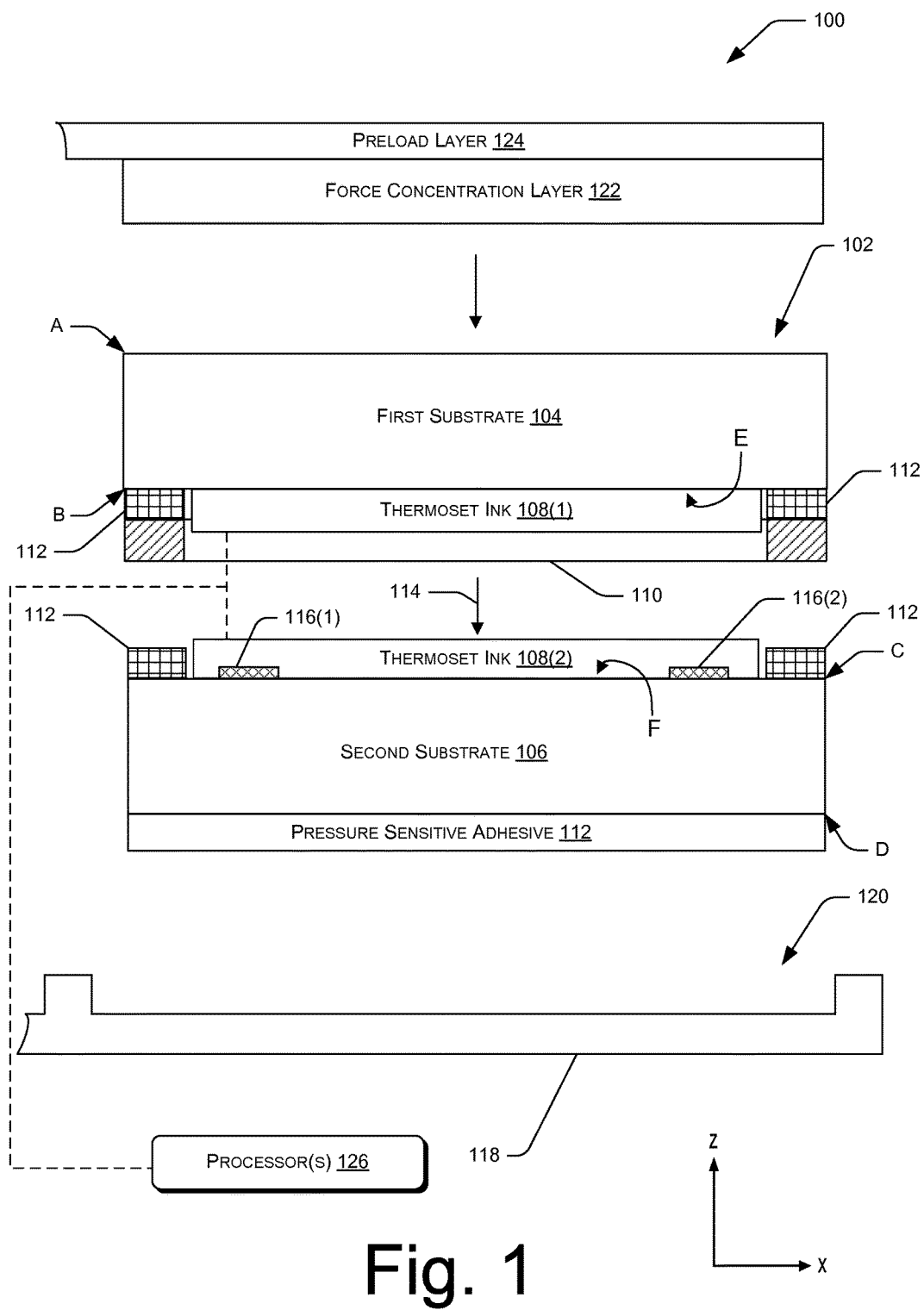
FIG. 1 illustrates an example cross-sectional exploded view of an FSR assembly.

This disclosure describes, in part, electronic devices that include one or more FSR assemblies including materials having at least one of a decomposition temperature greater than or equal to approximately 300° Celsius or a coefficient of thermal expansion less than or equal to approximately 30. FSR assemblies of the present disclosure may also include inks having at least one of a curing temperature between approximately 250° Celsius and approximately 350° Celsius, an electrical resistance between approximately 16 k$\Omega$/mm$^2$ and approximately 29 k$\Omega$/mm$^2$, or an electrical resistance between approximately 100 k$\Omega$/mm$^2$ and approximately 250 k$\Omega$/mm$^2$. This disclosure also describes techniques for manufacturing electronic devices, and in particular, for manufacturing example FSR assemblies and incorporating such assemblies into electronic devices. In such example methods, the above materials may be heated to between approximately 150° Celsius and approximately 250° Celsius for between approximately 10 minutes and approximately 30 minutes. The relatively high decomposition temperatures and relatively low coefficients of thermal expansion associated with such materials may enable curing the above inks without causing damage to portions of the FSR assembly. Additionally, the relatively high curing temperatures of the above inks may substantially eliminate the risk of such inks reflowing during operation.

Example FSR assemblies described herein are configured to respond to incident force by changing resistance. The FSR assemblies may include, for example, a first substrate and a second substrate opposite the first substrate. The FSR assemblies may also include one or more thermoset inks disposed on, embedded within, and/or otherwise in contact with at least one of the first and second substrates. In some embodiments, the FSR assemblies may also include a spacer spacing the first substrate from the second substrate such that a gap is formed between thermoset ink disposed on the first substrate and thermoset ink disposed on the second substrate. Optionally, a layer of adhesive may be used to separate thermoset ink disposed on the first substrate from thermoset ink disposed on the second substrate. In additional embodiments, the FSR assemblies may also include at least one of a preload layer and a force concentration layer. In example embodiments, the force concentration layer may be disposed between the preload layer and the first substrate. In such embodiments, at least one of the first substrate or the second substrate may be subjected to a preload force, while at steady-state, via the preload layer. It is understood that while the FSR assembly is at steady-state, no external forces, such as forces applied by the user associated with a touch input, may be applied to the FSR assembly. For example, in such embodiments the FSR assembly may be connected to one or more components of the electronic device, and the preload layer and/or the force concentration layer may compress the first and second substrates against the one or more components of the electronic device, thereby applying the preload force to at least one of the first and second substrates in the absence of further external forces applied to the at least one of the first substrate or the second substrate. In example embodiments, such a preload force may be between approximately 100 gram force (gf) and approximately 500 gf.

As will be described in greater detail below, in example embodiments at least one of the first substrate or the second substrate may be made from one or more flexible and/or electrically insulative materials. In some examples, such materials may include a polyimide or other known material having a decomposition temperature greater than or equal to approximately 300° C. In some embodiments, a decomposition temperature of various materials may be a temperature at which extensive species change occurs, caused by the application of heat. Such decomposition may include, for example, fragmentation of materials into smaller molecules through the breaking of intramolecular bonds. As a result of such decomposition, the materials may become brittle and/ or more prone to failure. In some embodiments, the decomposition temperature of materials described herein may be greater than or substantially equal to the melting temperature of such materials. In further embodiments, however, the decomposition temperature of materials described herein may be less than such melting temperatures.

Materials used to form at least one of the first substrate or the second substrate may also have a coefficient of thermal expansion less than or equal to approximately 30. In example embodiments, the coefficient of thermal expansion may be a measurement of an amount of expansion of the material divided by the change in temperature experienced by the material.

In example embodiments, the first substrate may be made from the same material as the second substrate, and in further embodiments, the first substrate may be made from a different material than the second substrate. It is understood that the above temperatures and coefficients are examples used for discussion purposes, and in further embodiments, temperatures and/or coefficients greater than or less than those noted above may be employed.

Likewise, the first and second substrates may have any length, width, height, thickness, shape, material composition, and/or other configuration, and in some embodiments the respective configurations of the first and second substrates may be the same while in other embodiments at least one such configuration of the first and second substrates may be different. In each of the example embodiments described herein, the configurations and/or other characteristics of the first and second substrates may enable the substrates to withstand the elevated curing temperatures associated with the thermoset inks described herein with substantially no deformation. In an example embodiment, a curing temperature may be a temperature at which the thermoset ink irreversibly toughens or hardens due to, for example, the cross-linking of polymer chains associated with materials used in the ink. Such configurations and/or characteristics may also enable at least one of the substrates to flex in one or more directions in response to the application of external forces, such as forces associated with a touch input.

In example embodiments, thermoset inks of the present disclosure may include at least one of carbon black particles, silver particles, and/or other electrically conductive components. In such embodiments, the particles included in the thermoset inks may have any known particle size. In some examples, carbon black particles employed by thermoset inks of the present disclosure may have a particle size between approximately 70 nanometers and approximately 2 micrometers. Silver particles employed by such thermoset inks may also have a particle size between approximately 70 nanometers and approximately 2 micrometers. Additionally, the thermoset inks may include between approximately 1 percent by weight and approximately 5 percent by weight of a solvent, and a remainder of the ink may comprise one or more of the particles or other electrically conductive components described herein. For example, such thermoset inks may include a urethane, a phenol-based resin, or an epoxy-based resin. It is understood that the above particle sizes and percentages are examples used for discussion purposes, and in further embodiments, particle sizes and/or percentages greater than or less than those noted above may be employed.

The thermoset inks described herein may have a curing temperature between approximately 250° C. and approximately 350° C., and such inks may be manufactured to have an electrical resistance between approximately 16 k$\Omega$/mm$^2$ and approximately 29 k$\Omega$/mm$^2$. In further example embodiments, at least some such inks may be manufactured to have an electrical resistance between approximately 100 k$\Omega$/mm$^2$ and approximately 250 k$\Omega$/mm$^2$. In example embodiments, an electrical resistance of a material may be a measure of the opposition to the passage of an electric current through the thermoset ink. Additionally, in some embodiments the same thermoset ink may be disposed on, embedded within, and/or otherwise in contact with both the first and second substrates, while in other embodiments, a first thermoset ink may be in contact with the first substrate and a second thermoset ink different from the first thermoset ink may be in contact with the second substrate. It is understood that the above curing temperatures and electrical resistances are examples used for discussion purposes, and in further embodiments, curing temperatures and/or electrical resistances greater than or less than those noted above may be employed.

For example, in some embodiments a first or thermoset ink including carbon black particles may be in contact with the first substrate while a second or thermoset ink including silver particles may be in contact with the second substrate. In such embodiments, for example, the second thermoset ink may be disposed on a surface of the second substrate, and the FSR assembly may further include a layer of carbon material or other known conductive material disposed on the second thermoset ink, such as between the second thermoset ink and the first thermoset ink of the first substrate. It is understood that the relatively high curing temperatures of the thermoset inks described herein may substantially eliminate the risk of the thermoset inks reflowing during operation, thereby increasing the reliability of the FSR assembly. Additionally, such inks may be characterized by improved adhesion characteristics and more consistent electrical resistance properties (i.e., conductivity), thereby further improving the overall performance of the associated FSR assembly.

The example FSR assemblies described herein may be implemented in a very low profile configuration, e.g., having an overall thickness or height of less than 250 micrometers. Such assemblies may be configured to detect incident applied forces which result in deflection (i.e., flexing) of a portion of the assemblies. Due to the characteristics of the assemblies, very small deflections may be detected. For example, in some implementations an FSR assembly may detect applied forces which result in a deflection of as little as 5 microns.

One or more of the FSR assemblies may be arranged beneath a structure, such as a portion of an exterior of a device in which each such assembly is a component. In one implementation, a bezel or edge may extend around or along a perimeter of a device such as a tablet computer, e-reader device, and so forth. For example, the bezel may be above or in front of the FSR assembly. The FSR assembly may be coupled to at least a portion of this bezel. The portion of the bezel to which the FSR assembly is coupled may be a single unbroken piece of material, such as a piece of glass, plastic, metal, and so forth. In one implementation a single piece of cover glass may be extended beyond the edges of a display panel, and may extend to a corresponding exterior back portion of the device to form the bezel. Because the FSR assembly is able to detect incident applied forces which result in very small deflections, the FSR assembly is able to detect applied forces which are transmitted by the bezel material.

Example FSR assemblies and electronic devices will now be described with reference to the accompanying figures. The described implementations are depicted as being part of a particular type of electronic device. It should be noted, however, that the described implementations and the device in which they are incorporated are merely examples of the wide range of FSR assemblies and devices contemplated. The scope of the invention should therefore not be limited with reference to these examples. Additionally, it should be noted that the figures in this disclosure are illustrative. In some instances various features have been exaggerated in size for clarity of illustration. The figures are not necessarily to scale, and may not necessarily be proportionate with one another.

FIG. 1 a partial schematic cross-sectional view 100 of a portion of an example electronic device of the present disclosure. The view 100 depicts an example FSR assembly 102 in combination with additional components of the device. For the purposes of discussion and not by way of limitation, the terms "above" and "below" or "front" and "back" are used relative to the Z-axis indicated in at least FIG. 1. The Z-axis is orthogonal to a primary plane of the FSR assembly shown in FIG. 1, wherein the primary plane is defined by the two longest axes of the electronic device (the X-axis shown in FIG. 1 and the Y-axis shown in at least FIG. 4) which are orthogonal to one another.

An example FSR assembly 102 may include a first substrate 104. The first substrate 104 may comprise a printed circuit board, paper, an exterior casing of the device 404, an internal component such as a frame, and so forth. The first substrate 104 may be an electrical insulator at voltages used in the FSR assemblies 102. For example, the first substrate 104 may comprise a plastic, a polymer, a polyimide, and/or any other known electrically insulative, substantially flexible material. In one implementation the first substrate may comprise and/or may otherwise be made from at least one of PET, Kapton®, Polysulfone ("PSU"), Polyetherimide ("PEI"), Polyether Ether Ketone ("PEEK"), or other materials. Additionally, in some embodiments the first substrate 104 may have a thickness (as measured along the Z-axis) between approximately 50 micrometers and approximately 150 micrometers.

In example embodiments, the first substrate 104 may be made from a polyimide and/or other material having at least one of a decomposition temperature greater than or equal to approximately 300° Celsius, or a coefficient of thermal expansion less than or equal to approximately 30. For example, the first substrate 104 may comprise a polyimide having a decomposition temperature between approximately 350° Celsius and approximately 400° Celsius, and a coefficient of thermal expansion equal to approximately 27. In addition, the first substrate 104 may be made from a material having a relatively high surface energy in order to improve adhesion characteristics of the substrate 104. For example, the first substrate 104 may be made from a material having a surface energy greater than approximately 40 dynes/cm. It is understood that the above temperatures, surface energies, and coefficients are examples used for discussion purposes, and in further embodiments, temperatures, surface energies, and/or coefficients greater than or less than those noted above may be employed.

Additionally, as shown in FIG. 1, the first substrate 104 may have a top surface A and a bottom surface B opposite the top surface A. In example embodiments, at least one of the top and bottom surfaces A, B may be substantially planar surfaces of the first substrate 104, and the top surface A may be configured to mate with a force concentration layer and/or with a preload layer of the electronic device. For example, a force concentration layer may be disposed between a preload layer and the top surface A of the first substrate 104. In some embodiments, at least one of the top surface A or the bottom surface B may be plasma treated and/or chemically treated to improve the adhesion characteristics of the first substrate 104.

The FSR assembly 102 may also include a second substrate 106 disposed opposite the first substrate 104. In example embodiments, the second substrate 106 may be substantially structurally and/or functionally identical to the first substrate 104. Alternatively, at least one of the shape, length, width, height, thickness, material composition, coefficient of thermal expansion, decomposition temperature, surface energy, and/or other configurations of the second substrate 106 may be different from a corresponding configuration of the first substrate 104.

In an example embodiment, the second substrate 106 may be an electrical insulator at voltages used in the FSR assemblies 102. For example, the second substrate 106 may comprise a plastic, a polymer, a polyimide, and/or any other known electrically insulative, substantially flexible material, and such materials may be the same as the materials described above with regard to the first substrate 104. Additionally, the second substrate 106 may have a thickness (as measured along the Z-axis) between approximately 50 micrometers and approximately 150 micrometers. In example embodiments, the first substrate 104 may have a first thickness, and the second substrate 106 may have a second thickness that is greater than, less than, or substantially equal to the first thickness of the first substrate 104.

In some embodiments the second substrate 106 may be made from a polyimide and/or other material having at least one of a decomposition temperature greater than or equal to approximately 300° Celsius, or a coefficient of thermal expansion less than or equal to approximately 30. For example, the second substrate 106 may comprise a polyimide having a decomposition temperature between approximately 350° Celsius and approximately 400° Celsius, and a coefficient of thermal expansion equal to approximately 27. In addition, the second substrate 106 may be made from a material having a relatively high surface energy, and such a surface energy may be, for example, greater than approximately 40 dynes/cm. It is understood that the above surface energy, temperatures, and coefficients are examples used for discussion purposes, and in further embodiments, surface energies, temperatures, and/or coefficients greater than or less than those noted above may be employed.

Additionally, as shown in FIG. 1, the second substrate 106 may have a top surface C and a bottom surface D opposite the top surface C. In example embodiments, at least one of the top and bottom surfaces C, D may be substantially planar surfaces of the second substrate 106, and the bottom surface D may be configured to mate with a midframe of the electronic device. In some embodiments, at least one of the top surface C or the bottom surface D may be plasma treated and/or chemically treated to improve the adhesion characteristics of the second substrate 106. In example embodiments, the first substrate 104 may be positioned, relative to the second substrate 106, such that at least a portion of the bottom surface B faces at least a portion of the top surface C.

The FSR assembly 102 may also include a thermoset ink 108(1), 108(2) (collectively, "the thermoset ink 108") disposed on, embedded within, and/or otherwise in contact with the first substrate 104 and with the second substrate 106. For example, the thermoset ink 108(1) may be disposed on at least a portion E of the bottom surface B and the thermoset ink 108(2) may be disposed on at least a portion F of the top surface C of the second substrate 106. Alternatively, in further embodiments the thermoset ink 108(1), 108(2) may be disposed on substantially the entire bottom surface B and/or substantially the entire top surface C of the first and second substrates 104, 106, respectively. As shown in at least FIG. 1, the portion E of the bottom surface B may be disposed opposite and/or may face the portion F of the top surface C. In one implementation, the thermoset ink 108 may have a thickness (as measured along the Z-axis) of between approximately 25 micrometers and approximately 75 micrometers, and may have a width (as measured along the X-axis) of between approximately 0.5 millimeters and approximately 2.5 millimeters.

The thermoset ink 108 may be made from any material which exhibits a change in resistance (by itself or in combination with other materials) upon application of a force thereto. Such materials include, but are not limited to various types of commercially available and proprietary conductive ink (e.g., conductive inks from Henkel AG & Co. of Dusseldorf, Germany), as well as other types of materials such as, for example, carbon nanotubes and carbon nanobuds (doped to have a high resistance), carbon-embedded ESD sheets, etc. In example embodiments, the thermoset ink 108 may include at least one of carbon black particles, silver particles, and/or other electrically conductive materials. For example, the thermoset ink 108 may include carbon black particles having a particle size between approximately 70 nanometers and approximately 2 micrometers, and in further embodiments, the thermoset ink 108 may include silver particles having a particle size between approximately 70 nanometers and approximately 2 micrometers. It is understood that the above particle sizes are examples used for discussion purposes, and in further embodiments, particle sizes greater than or less than those noted above may be employed. Additionally, in some embodiments a particle size may comprise a diameter, length, width, height, shape, weight, volume, and/or other characteristic of the particular particle(s).

In some embodiments, the thermoset ink 108(1) disposed on, embedded within, and/or otherwise in contact with the first substrate 104 may be substantially the same as the thermoset ink 108(2) disposed on, embedded within, and/or otherwise in contact with the second substrate 106, while in other example embodiments the thermoset ink 108(1) in contact with the first substrate 104 may be different from the thermoset ink 108(2) in contact with the second substrate 106. For example, the thermoset ink 108(1) in contact with the first substrate 104 may comprise a first thermoset ink including carbon black particles while the thermoset ink 108(2) in contact with the second substrate 106 may comprise a second thermoset ink including silver particles, or vice versa. Additionally, in such embodiments the FSR assembly 102 may include at least one layer of carbon, silver, conductive film, or other conductive materials disposed on either the first substrate 104 or the second substrate 106. For example, in embodiments in which the first thermoset ink described above is disposed on the portion E of the bottom surface B and in which the second thermoset ink described above is disposed on the portion F of the top surface C, the FSR assembly 102 may include a layer of carbon (i.e., a carbon overlay) disposed on either the first thermoset ink 108(1) or the second thermoset ink 108(2) such that the layer of carbon is disposed between the second thermoset ink and the first thermoset ink. Such an additional conductive layer of material disposed between the thermoset inks 108(1), 108(2) may assist the thermoset ink 108 in generating a signal indicative of a force applied to the FSR assembly 102.

In example embodiments, the thermoset ink 108 may be made from a combination of components that includes, for example, one or more of the carbon black particles, the silver particles, and/or other materials described above. For example, one or more of such materials may be combined with a base material such as a solvent and/or a resin in order to obtain a desired viscosity, a desired electrical conductivity, a desired electrical resistance, and/or other characteristic. In such embodiments, one or more of the materials described above may be mixed with such a base material at any proportion in order to achieve a thermoset ink 108 having desired characteristics. For example, a thermoset ink 108 of the present disclosure may include between approximately 1% by weight and approximately 5% by weight of a solvent, and at least a portion of a remainder of such a thermoset ink 108 may comprise at least one of carbon black particles or silver particles. In any of the embodiments described herein, the solvent may comprise at least one of a urethane, a phenol-based resin, or an epoxy-based resin. For example, the solvent may comprise at least one of Diethylene Glycol Monobutyl Ether, or Butyl Carbitol Acetate. Additionally, the thermoset ink 108 may have an electrical resistance between approximately 16 k$\Omega$/mm$^2$ and approximately 29 k$\Omega$/mm$^2$. For example, the thermoset ink 108 may have an electrical resistance equal to approximately 22 k$\Omega$/mm$^2$ within +/−10 percent. It is understood that the above proportions and electrical resistances are examples used for discussion purposes, and in further embodiments, proportions and/or electrical resistances greater than or less than those noted above may be employed. For example, in further embodiments the thermoset ink 108 may have an electrical resistance between approximately 100 k$\Omega$/mm$^2$ and approximately 250 k$\Omega$/mm$^2$. It is understood that the above temperatures, electrical resistances, and coefficients are examples used for discussion purposes, and in further embodiments, temperatures, electrical resistances, and/or coefficients greater than or less than those noted above may be employed. It is also understood that the electrical resistance, temperatures, coefficients, and/or other characteristics of the first thermoset ink 108(1) may be different from the corresponding electrical resistance, temperatures, coefficients, and/or other characteristics of the second thermoset ink 108(2). Further, in some embodiments, one of the thermoset ink 108(1), 108(2) may be omitted. For example, in some embodiments the thermoset ink 108(1) may be disposed on the bottom surface B while the thermoset ink 108(2) shown in FIG. 1 may be omitted.

As shown in FIG. 1, in some embodiments the FSR assembly 102 may also include a spacer 110 spacing the first substrate 104 from the second substrate 106 by any desired distance. In such embodiments, the spacer 110 may form at least part of a gap G (FIG. 2) extending from, for example, the first substrate 104 to the second substrate 106. In example embodiments, the spacer 110 may be formed from any of the materials described herein with respect to the first substrate 104, the second substrate 106, and/or other components of the electronic device. For example, the spacer 110 may comprise PET or any other polymer configured to maintain the gap G between, for example, the bottom surface B and the top surface C while a preload force is applied to the FSR assembly 102.

For example, the spacer 110 may comprise an O-ring, gasket, and/or other like substantially annular component extending around at least a portion of a perimeter of either the bottom surface B or the top surface C. In some embodiments, the spacer 110 may extend around an entire perimeter of either the bottom surface B or the top surface C. In such embodiments, the spacer 110 may be pinned, adhered, and/or otherwise connected to either the bottom surface B or the top surface C, such as by a pressure sensitive adhesive ("PSA") 112 applied to the spacer 110 and/or to at least one of the respective surfaces B, C. In such embodiments, the thermoset ink 108(1) may be disposed on a portion E of the bottom surface B located radially inward (along the X-axis) of the spacer 110. Likewise, the thermoset ink 108(2) may be disposed on a portion F of the top surface C located radially inward (along the X-axis) of the spacer 110. In this way, the gap G (FIG. 2) may be formed between the thermoset ink 108(1) disposed on the bottom surface B of the first substrate 104 and the thermoset ink 108(2) disposed on the top surface C of the second substrate 106. In further embodiments, the spacer 110 may only be disposed on one side of the FSR assembly 102, such as proximate a radially outer edge of the electronic device. In still further embodiments, the spacer 110 may be omitted. In embodiments in which the spacer 110 has been omitted, the PSA 112 may assist in forming at least a portion of the gap G in place of the spacer 110. For example, the PSA 112 may be disposed between the first substrate 104 and the second substrate 106, and the PSA 112 may separate the thermoset ink 108(1) disposed on the portion E of the bottom surface B from the thermoset ink 108(2) disposed on the portion F of the top surface C by any desired distance. Such a distance may extend, for example, along the Z-axis.

In example embodiment, at least the first substrate 104 may be configured to deflect and/or otherwise flex in response to the application of force associated with receiving a touch input from a user. For example, at least part of the first substrate 104 may be configured to flex in the direction of arrow 114 in response to the application of such a force. In such embodiments, flexing of the first substrate 104 may place the thermoset ink 108(1) disposed on the bottom surface B in contact with the thermoset ink 108(2) disposed on the top surface C. Such contact between the thermoset ink 108(1), 108(2) may result in generation of an output signal by the FSR assembly 102 indicative of, for example, a touch input. Additionally, it is understood that due to the presence of the spacer 110 and/or the PSA 112 disposed between the substrates 104, 106, portions of the bottom and top surfaces B, C disposed proximate and/or in contact with the spacer 110 may remain spaced while flexing of the first substrate 104 places the thermoset ink 108(1) in contact with the thermoset ink 108(2).

The PSA 112 may comprise ethylene-vinyl acetate, silicone rubbers, styrene block copolymers, and so forth. In some embodiments, the PSA 112 may comprise a substantially electrically insulative material at the voltages in which the FSR assembly 102 operates.

In some example embodiments, one or more conductors 116(1), 116(2) (collectively "conductors 116") may be disposed on at least one of the first and second substrates 104, 106. Such conductors 116 may be configured to provide for one or more electrically discrete touch zones of the electronic device. In the embodiment of FIG. 1, two conductors 116(1), 116(2) may be employed by an example FSR assembly 102, however in additional embodiments (such as the embodiment of FIG. 3), greater than or less than two conductors 116(1), 116(2) may be used. One conductor 116(1) may be provided for each of the touch zones described herein, while the other conductor 116(2) may be used as a common or ground. Each of the conductors 116 may comprise a conductive polymer, metal, and so forth. For example, in some implementations the conductors 116 may comprise copper, silver (e.g., silver nanowires (AgNW) coated with PEDOT:PSS), or aluminum. In further embodiments, the conductors 116 may comprise semi-conductive thermoset ink, such as one or more of the thermoset inks 108 described herein.

In still further embodiments, one or more portions of dielectric material (FIG. 3) may be applied to at least a portion of the one or more conductors 116. For example, the dielectric material may comprise a polymer, ceramic, aerogel, or other material which acts as an insulator at the voltages used in the FSR assembly 102. The example dielectric material may be disposed proximate a radially outermost edge of the FSR assembly 102, such as on a radially outermost portion of the surface C and/or of the surface B. Additionally, one or more conductive traces or other structures may be applied atop at least a portion of the conductors 116, and may be uncovered by the dielectric material. In example embodiments, such traces may be configured such that each of the traces electrically couple to a different conductor 116(1), 116(2). In some cases, the conductive traces may also extend over at least portions of the top of the dielectric material described above. In other implementations, the traces may be replaced with other materials, such as metals, electrically conductive polymers, quantum tunneling composites, and so forth. Additionally, the dielectric material may overlay and/or may otherwise be disposed on at least one of the conductors 116. In such embodiments, the dielectric material may be, for example, disposed between the bottom surface B and the top surface C.

As shown in FIG. 1, the electronic device may also include a force concentration layer 122 and/or a preload layer 124. In some embodiments, at least one of the force concentration layer 122 or the preload layer 124 may be a component of the electronic device, and in other embodiments, at least one of the force concentration layer 122 or the preload layer 124 may be a component of the FSR assembly 102.

In example embodiments, the force concentration layer 122 may be disposed between the preload layer 124 and one or more components of the FSR assembly 102. For example, the preload layer 124 may be disposed on top of the force concentration layer 122 and beneath a display and/or an exterior of the electronic device such that a force applied to the exterior of the device may be transmitted to the FSR assembly 102 via the preload layer 124 and the concentration layer 122. In addition, the preload layer 124 and/or the force concentration layer 122 may comprise a plastic, polymer, metal, film, foam, and/or other material configured to apply a compressive preload force to the FSR assembly 102 via the concentration layer 122. For example, the preload layer 124 may be made from Poron® or other known materials, and the force concentration layer 122 may be made from polyethylene terephthalate ("PET") or other such materials. In some embodiments, the force concentration layer 122 may be made from the same material as the preload layer 124, while in other embodiments, the force concentration layer 122 may be made from a different material than the preload layer 124. Additionally, as will be described in greater detail below, in some embodiments the force concentration layer 122 may be disposed along less than the entire top surface A of the first substrate 104. In such embodiments, the force concentration layer 122 may, for example, apply a compressive preload force to only the portions of the top surface A with which the force concentration layer 122 is in contact.

During assembly, the preload layer 124 and/or the force concentration layer 122 may be compressed between the exterior of the device and the FSR assembly 102, and in particular, the preload layer 124, the force concentration layer 122, and the FSR assembly 102 may be compressed between the exterior and the midframe 118. Such compression may result in a preload force being applied to the FSR assembly 102. In example embodiments, such a preload force may be great enough such that the FSR assembly 102 may generate a base output signal in response to the preload force. As will be described herein, in example embodiments such a preload force may be between approximately 100 gf and approximately 500 gf.

As noted herein, the force concentration layer 122 may have any desired length, width, height, shape, and/or other configuration to assist in directing such a preload force to the FSR assembly 102. For example, the force concentration layer 122 may have a length, width, height, shape, and/or other configuration that is substantially equal to a corresponding configuration of at least one component of the FSR assembly 102. In such embodiments, the preload layer 124 may have a corresponding configuration that is greater than or equal to that of the force concentration layer 122. For example, the force concentration layer 122 may have a width or other dimension along the X-axis that is substantially equal to a corresponding width of at least one component of the FSR assembly 102. In such embodiments, the preload layer 124 may have a width or other dimension along the X-axis that is greater than or equal to the width of the force concentration layer 122.

In each of the example embodiments described herein, the conductors 116, dielectric material, traces, and/or other such components may assist the FSR assembly 102 in generating a signal in response to the application of a force, and such a signal may be indicative of a touch input. Additionally, the conductors 116, dielectric material, traces, and/or other such components may assist in connecting the FSR assembly 102 to one or more processors 126 of the electronic device. Alternatively, in further example embodiments the conductors 116, dielectric material, traces, and/or other such components may be omitted. In such embodiments, the thermoset ink 108 and/or other components of the FSR assembly 102 may be connected to the one or more processors 126 via one or more buses, connection pads, links, or other known connections. Such a connection is schematically illustrated in FIG. 1.

In addition to adhering the spacer 110 to the first and second substrates 104, 106, the PSA 112 may be used to adhere at least a portion of the FSR assembly 102 to the midframe 118. For example, a layer of PSA 112 may be applied to the bottom surface D of the second substrate 106 and/or to a recess 120 of the midframe 118 in order to assist in connecting the FSR assembly 102 to the midframe 118. In one implementation, the PSA 112 may have a thickness (as measured along the Z-axis) of about 50 micrometers.

In this disclosure, the term "apply" or "applying" may include one or more processes involving vapor deposition, fluidic material deposition using a plurality of jets, physical vapor deposition, material transfer from a subsequently removed carrier, screen printing, lamination, selective laser sintering, and so forth. For example, the PSA 112 may be applied by spraying adhesive material onto the first substrate 104, the second substrate 106, and/or the midframe 118.

Figure 2:
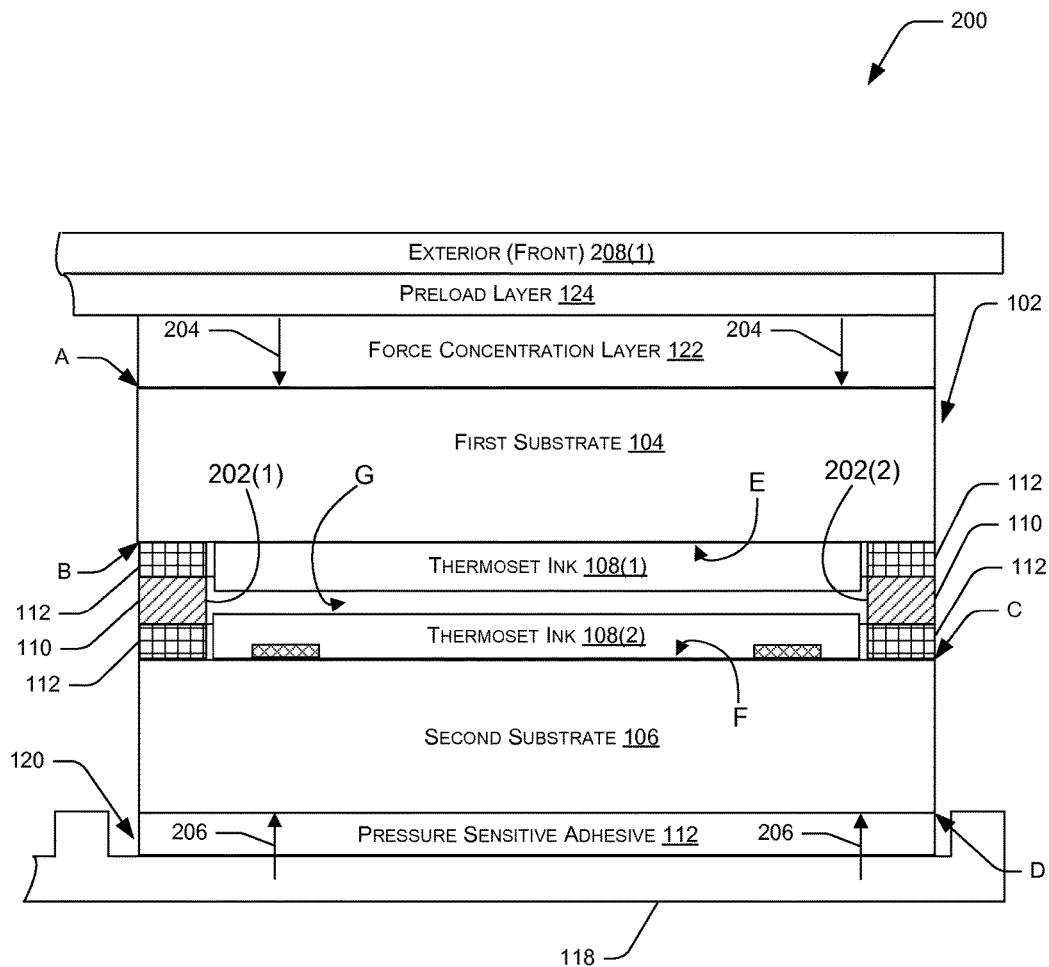
FIG. 2 illustrates another example cross-sectional view of an FSR assembly.

FIG. 2 illustrates another cross-sectional view 200 of an example FSR assembly 118. As shown in FIG. 2, an example gap G may extend, along the Z-axis, from the first thermoset ink 108(1) to the second thermoset ink 108(2) and/or from the bottom surface B to the top surface C. The gap G may also extend, along the X-axis, from a first inner surface 202(1) of the spacer 110 to a second inner surface 202(2) of the spacer 110 opposite the first inner surface 202(1). In such embodiments, the inner surfaces 202(1), 202(2) of the spacer 110 may define an inner diameter of the spacer 110. In this way, the inner surfaces 202(1), 202(2) of the spacer 110 may define at least a portion of the gap G. It is understood that in some embodiments, the PSA 112 disposed on the first and/or the second substrates 104, 106 may also define at least a portion of the gap G. Additionally, as noted above, in some embodiments the spacer 110 may be disposed along only a portion of at least one of the substrates 104, 106. For example, the spacer 110 may be disposed along only a radially outermost portion of the bottom surface B and/or the top surface C. In such embodiments, only the inner surface 202(2) of the spacer 110 may form a portion of the gap G. Alternatively, in embodiments in which the spacer 110 has been omitted, the PSA 112 may form a portion of the gap G in place of the spacer 110.

FIG. 2 also illustrates example preload forces that may be applied to at least one of the first substrate 104 or the second substrate 106 by the preload layer 124. For example, once the FSR assembly 102 is assembled, the preload layer 124 may compress the force concentration layer 122 against the top surface A of the first substrate 104, thereby applying a preload force 204 to the top surface A. In example embodiments, the preload force 204 may be applied by the preload layer 124 via the force concentration layer 122, and in such embodiments, the force concentration layer 122 may have a width and/or other dimension along the X-axis that is substantially equal to a corresponding width or other dimension of the top surface A. As a result, the force concentration layer 122 may direct the preload force 204 substantially uniformly along the top surface A. In alternative embodiments, however, the force concentration layer 122 may be localized. In such embodiments, the force concentration layer 122 may be, for example, discontinuous. Additionally, the force concentration layer 122 may extend along only a portion of the surface A. In such embodiments, for example, the force concentration layer 122 may extend proximate a radially inward portion of the surface A and/or along a radially outward portion of the surface A. Further, in some embodiments an exterior (i.e., top) 208(1) of the electronic device may be disposed on the preload layer 124 to assist the preload layer 124 in applying the preload force 204. For example, the exterior 208(1) may be connected to components of the electronic device such that the exterior 208(1) compresses both the preload layer 124 and the force concentration layer 122 against the top surface A of the first substrate 104. Such compression may assist the preload layer 124 in applying the preload force 204. The exterior 208(1) will be described in greater detail below.

Example preload forces 204 may have a magnitude between approximately 100 gf and approximately 500 gf in the absence of further external forces applied to, for example, the first substrate 104. Although such preload forces 204 may not be large enough to result in contact between, for example, the first thermoset ink 108(1) and the second thermoset ink 108(2), or between the bottom surface B and the top surface C, such preload forces 204 may cause the FSR assembly 102 to generate at least a base output signal. Such a base output signal may have a relatively low magnitude or other characteristic at the voltages utilized by the FSR assembly 102, and may not be indicative of, for example, a touch input. However, example preload forces 204 may have a sufficient magnitude such that when a touch input is received, the FSR assembly 102 may be conditioned (i.e., pre-loaded) to detect even relatively small deflections of, for example, the exterior 208(1) caused by the touch input. In this way, the preload forces 204 may maintain the FSR assembly 102 within its peak sensitivity range. Further, it is understood that the midframe 118 and/or other components of the electronic devices described herein may provide a resistance force 206 that is substantially equal to (and applied in substantially an opposite direction from) the applied preload force 204. In example embodiments, such a resistance force 206 may be applied to the bottom surface D of the second substrate 106 via the midframe 118, and/or via a layer of PSA 112 disposed between the midframe 118 and the bottom surface D.

Figure 3:
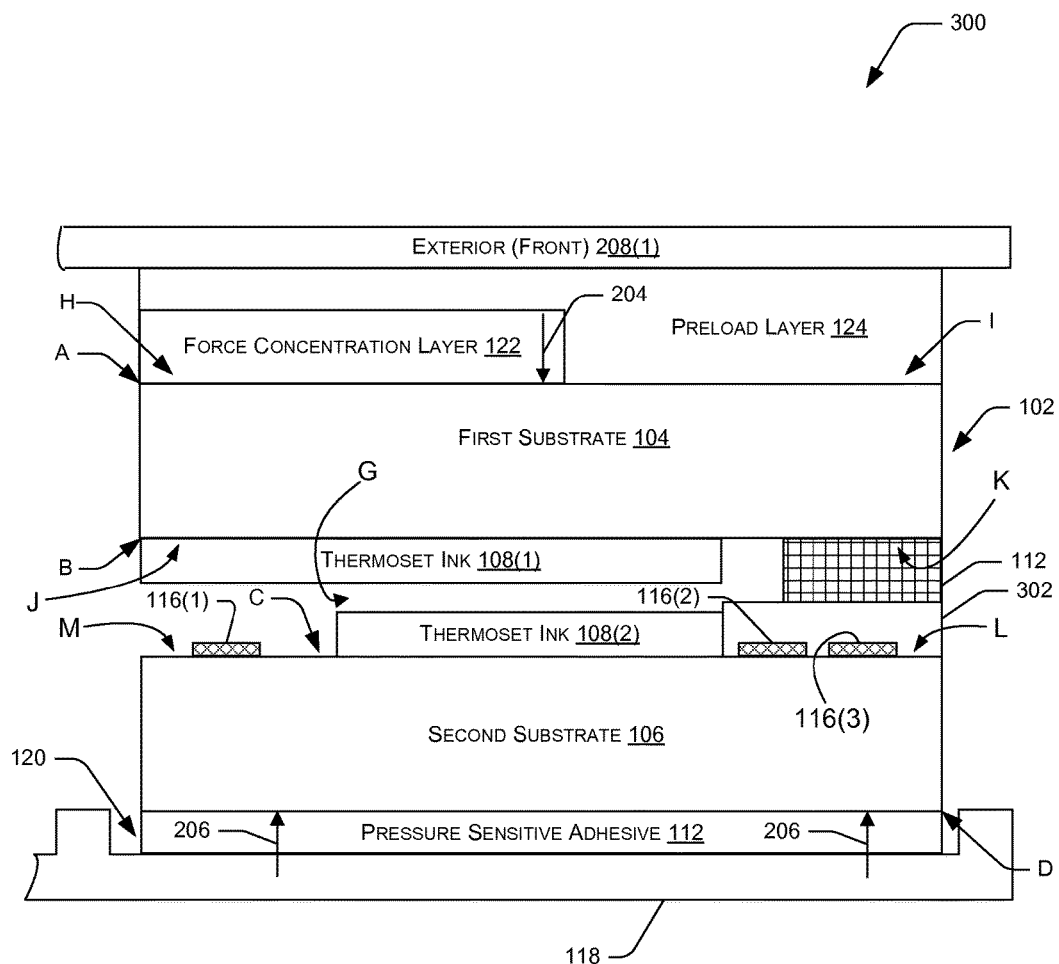
FIG. 3 illustrates still another example cross-sectional view of an FSR assembly.

FIG. 3 illustrates still another cross-sectional view 300 of an example FSR assembly 118. In the embodiment of FIG. 3, the spacer 110 described above has been omitted. Additionally, the force concentration layer 122 does not extend along substantially an entire width, in the direction of the X-axis, of the top surface A. Instead, the force concentration layer 122 extends only partially along the width of the top surface A and is positioned proximate and/or along, for example, a radially innermost portion H of the top surface A. In further embodiments, the force concentration layer 122 may be, for example, disposed along other portions of the top surface A, such as proximate a middle portion and/or proximate a radially outermost portion I of the top surface A opposite the radially innermost portion H.

As shown in FIG. 3, in some embodiments, such as embodiments in which the spacer 110 has been omitted, the first thermoset ink 108(1) may be disposed proximate and/or along, for example, a radially innermost portion J of the bottom surface B. Additionally, a layer of PSA 112 may be disposed proximate and/or along a radially outermost portion K of the bottom surface B. In such embodiments, the PSA 112 disposed on the bottom surface B may assist in forming a portion of the gap G. Additionally, in embodiments in which the spacer 110 has been omitted and no PSA 112 has been employed at the portion J of the bottom surface B, the first substrate 104 may be prone to flexing proximate the innermost portions H, J.

In further examples, the PSA 112 may be disposed at and/or proximate a radially outermost portion K of the bottom surface B, and a layer of dielectric material 302 may be disposed beneath the PSA 112. For example, the dielectric material 302 may be disposed at and/or proximate a radially outermost portion L of the top surface C. As noted above, in such embodiments, one or more conductors 116 may be disposed on the top surface C, and in some embodiments, the dielectric material 302 may overlay one or more conductors 116(2), 116(3) such that the conductors 116(2), 116(3) may be disposed beneath and/or embedded substantially within the dielectric material 302. For example, as shown in FIG. 3, the dielectric material 302 may overlay and/or may otherwise be disposed on at least one of the conductors 116(2), 116(3). In such embodiments, the dielectric material 302 may be disposed between the PSA 112 and the top surface C. Additionally, in such embodiments one or more additional conductors 116(1) may be disposed on the top surface C at and/or proximate a radially innermost portion M of the top surface C. Alternatively and/or in addition, one or more such additional conductors 116(1) may be disposed beneath the thermoset ink 108(2) on the top surface C of the second substrate 106.

Figure 4:
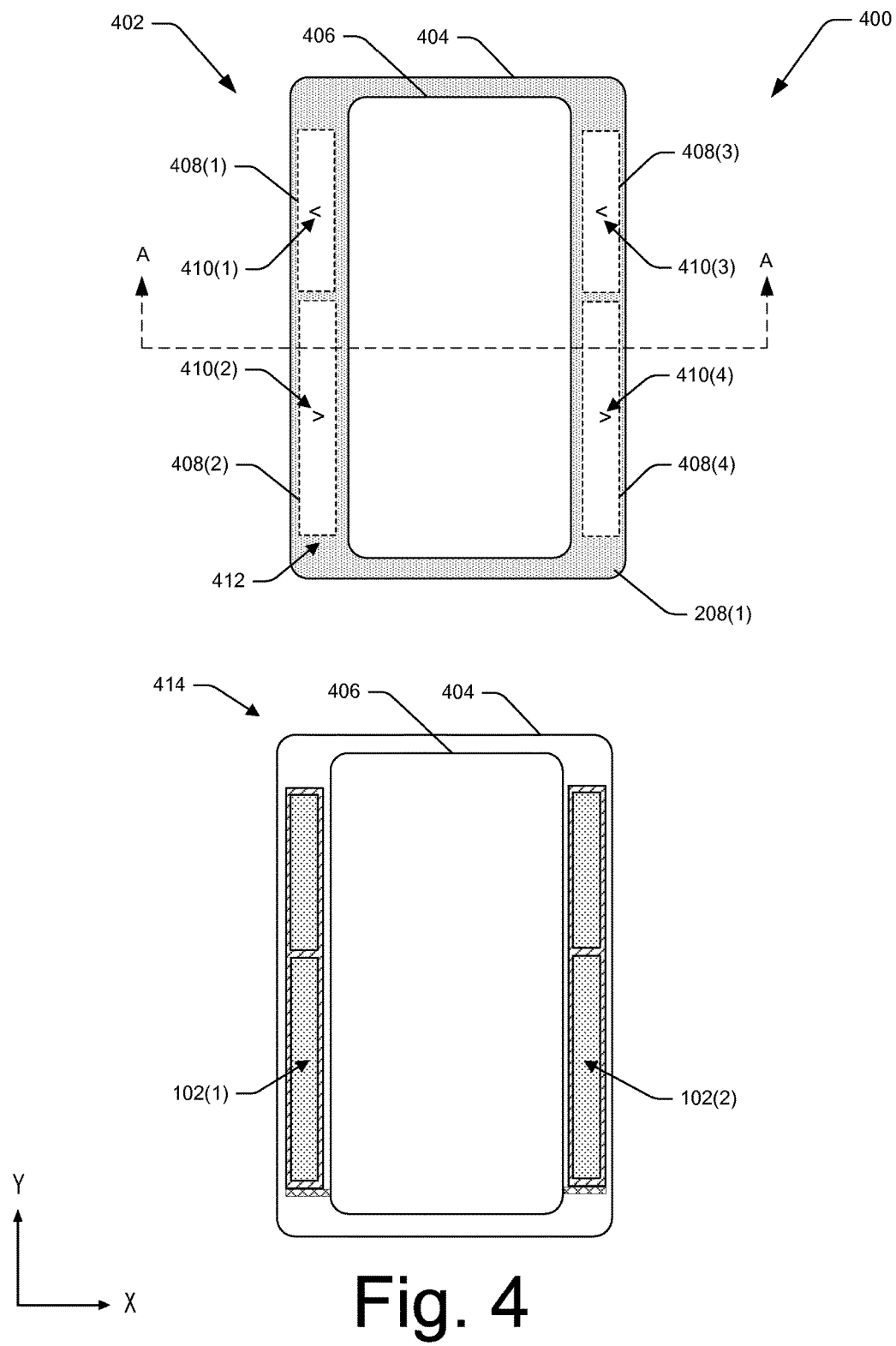
FIG. 4 illustrates an example device having FSR assemblies configured to accept user input at multiple touch zones.

FIG. 4 depicts views 400 of an illustrative electronic device. An exterior view 402 of an electronic device 404, such as an e-reader device configured to present content including websites, audio, video, electronic books ("e-books"), and/or other content is depicted. In some implementations the device 404 may include one or more displays 406. The device 404 may also have one or more touch zones 408(1), 408(2), . . . 408(n). In the depicted example, n=4. The touch zones 408 are areas upon which an incident applied force, such as a force associated with a user's touch input, may be detected. Particular touch zones 408 may be assigned particular functions. Markings 410 or other indicia may be provided to indicate the position, function, and so forth of the touch zones 408. The markings may include graphics, text, or other features such as ridges or bumps. The markings may be provided as decals, paint, etching, deposited material, ridges, bumps, etchings, and so forth.

The device 404 includes an exterior 208. The exterior 208 may be in one or more pieces and is configured to at least partially enclose the components of the device 404. In one implementation the exterior 208 may comprise a front cover piece and a back cover piece. The front cover piece is that portion which is proximate to the user during typical usage while the back cover piece is that portion which is distal to the user during typical usage. The front cover piece of the exterior 208 may be configured as a single unbroken piece of material. This material may include glass, plastic, metal, and so forth. In one implementation the front cover piece may comprise a single piece of material such as cover glass which extends beyond the edges of the display 406 and matches a corresponding back cover piece. The area which extends beyond the edges of the display 406 may be designated as a bezel 412.

One or more of the touch zones 408 may reside at least partly within the bezel 412. For example, as depicted in FIG. 4 two touch zones 408(1) and 408(2) are arranged along a left-hand edge of the device 404 in the bezel 412, while two additional touch zones 408(3) and 408(4) are arranged along a right-hand edge of the device 404 in the bezel 412.

In FIG. 4, a cutaway view 414 of the device 404 depicts FSR assemblies 102(1) and 102(2) beneath the left- and right-hand portions of the bezel 412, respectively. In the cutaway view 414 of FIG. 4, the front cover piece 208(1) of the exterior 208 has been removed for clarity. Each FSR assembly 102 may provide for one or more touch zones 408. In this illustration, each FSR assembly 102 provides for two touch zones, i.e., touch zones 408(1) and 408(2) of FSR assembly 102(1), and touch zones 408(3) and 408(4) of FSR assembly 102(2).

In some implementations, one or more of the FSR assemblies 102 may be arranged proximate to or underneath other elements, such as the display 406. For example, the display 406 may extend almost entirely to the edge of the device 404 and the FSR assembly 102 may be arranged behind the display 406. Force applied to the display 406 in the touch zone 408 may thus be detected by the underlying FSR assembly 102.

Figure 5:
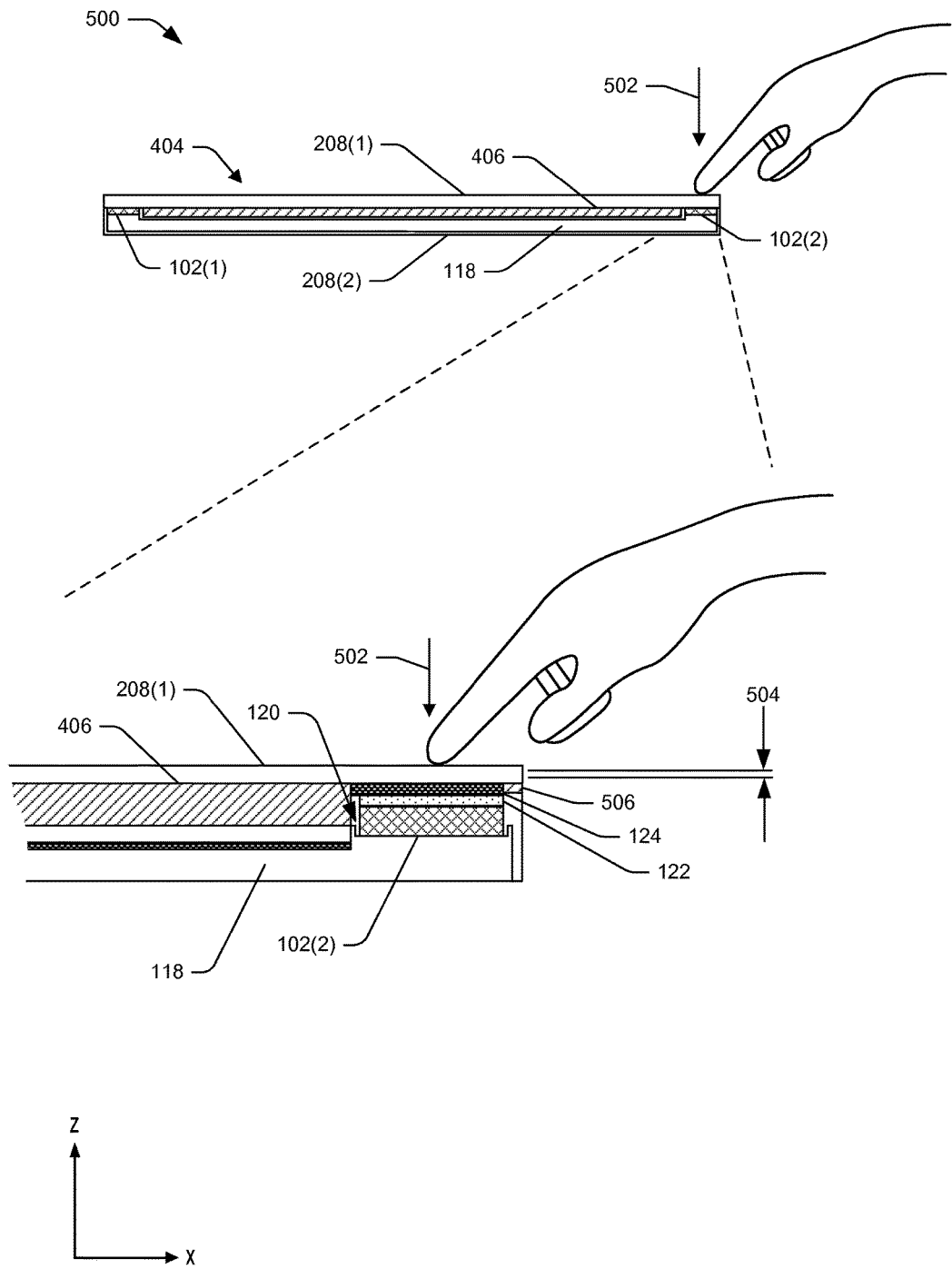
FIG. 5 illustrates an example cross-sectional view of the device of FIG. 4, and includes an enlarged view of a portion of the device and an FSR assembly.

FIG. 5 illustrates a cross-sectional side view 500 of the device 404 shown in FIG. 4, as well as an enlarged cross-sectional side view of a portion of the device 404. The cross-sections shown in FIG. 5 are taken along the line indicated by broken line "A-A" in FIG. 4, i.e., along the X-axis. For example, FIG. 5 illustrates the exterior (front) 208(1), and underneath or behind the exterior 208(1) is the display 406. Underneath or behind the display 406 is the midframe 118 or other internal structure of the device 404. The midframe 118 acts at least in part as a structural member, providing an attachment or mounting point for one or more components of the device 404. The midframe 118 may also provide rigidity when a preload and/or a force associated with a touch input is applied to the device 404.

Arranged between the exterior 208(1) and the midframe 118 are the FSR assemblies 102(1) and 102(2).

The user may apply a force 502, such as with a touch or a pinch on the device 404. The applied force 502 may be exerted on different portions of the device 404, such as on the display 406, the bezel 412, or other portions of the device 404. The touch may use one or more fingers, or be imparted by a device or tool such as a stylus. The applied force 502 may result in a deflection (i.e., flexing) 504 of the exterior 208(1), 208(2), or both. Such a deflection may be in the direction of, for example, the Z-axis and/or in any other direction relative to the X, Y, and/or Z-axes described herein. Due to the sensitivity of the FSR assembly 102, very small deflections 504 may result in measureable forces. In one implementation, the deflection 504 may be at least between 5 and 15 microns (millionths of a meter). Rigid materials such as glass, metal, plastic, and so forth as used in the exterior 208 deflect, deform, and/or otherwise flex under the applied force 502 to some degree. The deflection 504 of the exterior 208 and the transmission of the applied force 502 to the FSR assembly 102 are sufficient to generate a signal which may be used to designate activation. Depending upon the material, thickness, and other configurations of the exterior 208(1), this deflection may be a localized phenomenon, such as within a few millimeters or centimeters. As a result, deflection of the exterior 208(1) proximate to the touch zone 408(4) may not result in deflection at the touch zone 408(2) on another side of the device 404 which is detectable by the corresponding FSR assembly 102(1).

As noted above, the midframe 118 may be configured with a recess 120. In example embodiments the recess may comprise a feature configured to accommodate at least a portion of the FSR assembly 102. The midframe 118 may include other features such as alignment or registration features configured to aid assembly of the device 404. The FSR assembly 102 may be mechanically coupled to the exterior 208(1), the midframe 118, or both. In one implementation, the FSR assembly 102 may be adhered to the midframe 118 using the PSA 112 described herein.

In some implementations a seal 506 may be arranged along a perimeter of the exterior 208. The seal 506 may join two pieces of the exterior 208, join a portion of the exterior 208 to the midframe 118, the FSR assembly 102, or a combination thereof. In one implementation, the seal 506 may comprise an adhesive transfer tape or acrylic elastomer. Use of the seal 506 may increase compliance or deflection of the exterior 208 and improve sensitivity to the applied force 502 by the FSR assembly 102. It is understood that in some embodiments, the seal 506 may be disposed between, for example, the exterior 208(1) and the preload layer 124 and/or between any other adjacent components of the device 404. In such embodiments, the seal 506 may form at least a portion of an outer edge of the device 404.

Figure 6:
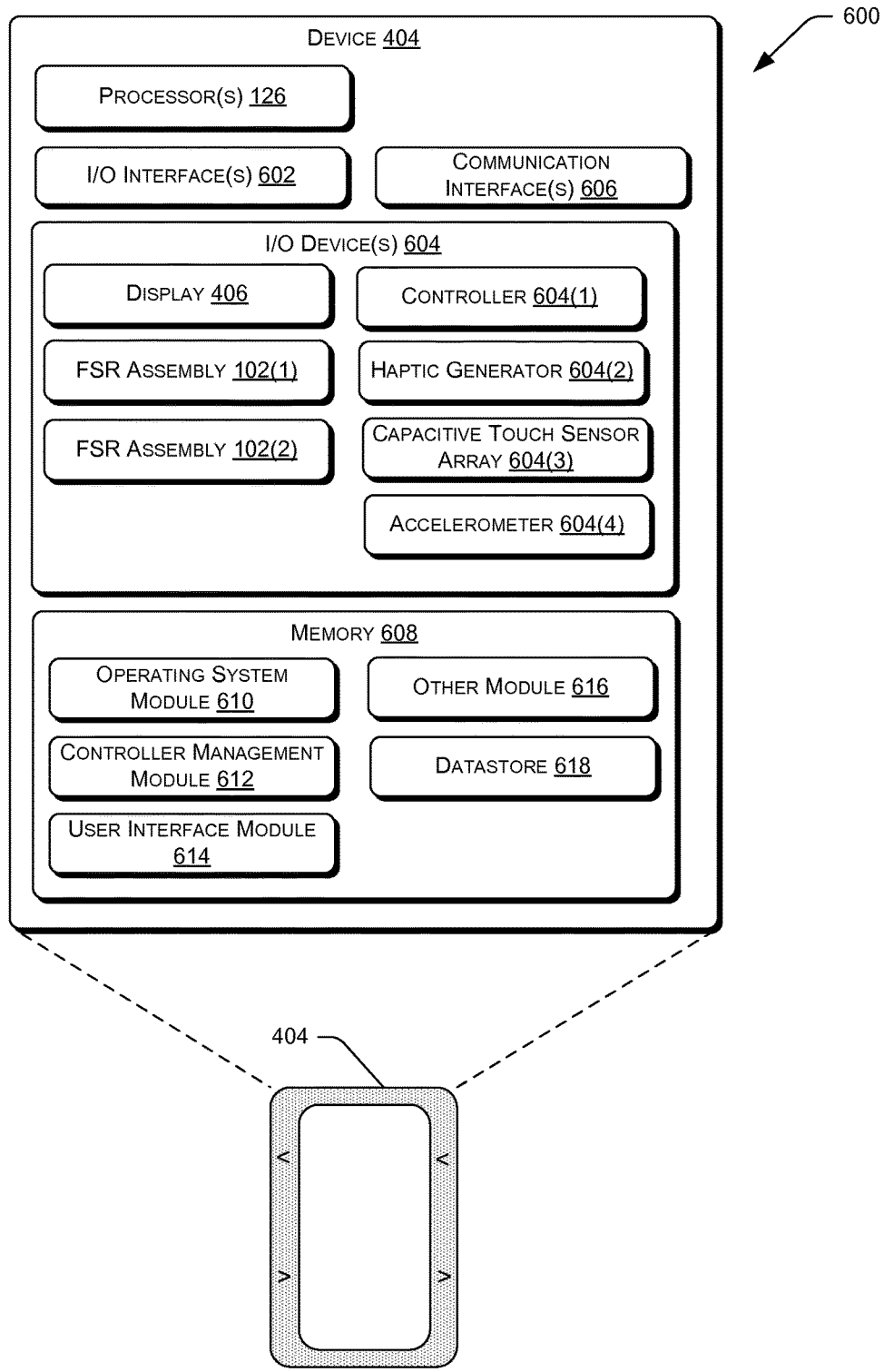
FIG. 6 illustrates an example block diagram of the device of FIG. 4 and various associated components, including the FSR assemblies and a processor.

FIG. 6 is a block diagram 600 of the device 404. The device 404 may include one or more processors 126 configured to execute stored instructions. The processors 126 may comprise one or more cores. The device 404 may include one or more input/output ("I/O") interface(s) 602 to allow the device 404 to communicate with other devices. The I/O interfaces 602 may comprise inter-integrated circuit ("I2C"), serial peripheral interface bus ("SPI"), universal serial bus ("USB"), RS-232, media device interface, and so forth.

The I/O interface(s) 602 may couple to one or more I/O devices 604. The I/O device(s) 604 may include one or more displays 406, FSR assemblies 102, controllers 604(1), haptic generators 604(2), capacitive touch sensor arrays 604(3), accelerometers 604(4), motion sensors, orientation sensors, and so forth. The one or more displays 406 are configured to provide visual output to the user. For example, the displays 406 may be connected to the processor(s) 126 and may be configured to render and/or otherwise display content thereon. The one or more displays 406 may comprise an electrophoretic or cholesteric material and may be configured to present an image using reflected light, ambient light, light from a front light, and so forth.

The FSR assemblies 102 as described above are configured to detect applied force such as, for example, force 502 of FIG. 2. The FSR assemblies 102 may be coupled to the controller 604(1). The controller 604(1) is configured to control and receive input from the FSR assembly 102 to determine the presence of the applied force 502, a magnitude of the applied force, and so forth. The controller 604(1) may be configured to designate one or more of the touch zones 408 have been activated. Based on this designation, the controller 604(1) may send a signal indicative of activated touch zones 408 to the one or more of the processors 126. In this way, the FSR assemblies 102 of the present disclosure may be connected to the processors 126. In some implementations the controller 604(1) may also be coupled to and configured to drive the haptic generator 604(2) with one or more haptic output waveforms. The haptic output waveforms are configured to provide a particular haptic output from the haptic generator 604(2).

The capacitive touch sensor array 604(3) is configured to determine the location of a user's touch based on a change in electrical capacitance. The capacitive touch sensor array 604(3) may comprise a matrix of conductors which are scanned to determine a location of a touch within the matrix. Output from the capacitive touch sensor array 604(3) may be used in conjunction with output from the FSR assembly 102. For example, the FSR assembly 102 may provide data indicative of the magnitude of an applied force which is unavailable from the capacitive touch sensor array 604(3) alone.

The device 404 may also include one or more communication interfaces 606 configured to provide communications between the device 404 and other devices. Such communication interface(s) 606 may be used to connect to one or more personal area networks ("PAN"), local area networks ("LAN"), wide area networks ("WAN"), and so forth. For example, the communications interfaces 606 may include radio modules for a WiFi LAN and a Bluetooth PAN. The device 404 may also include one or more busses or other internal communications hardware or software that allow for the transfer of data between the various modules and components of the device 404.

As shown in FIG. 6, the device 404 includes one or more memories 608. The memory 608 comprises one or more non-transitory computer-readable storage media ("CRSM"). The CRSM may be anyone or more of an electronic storage medium, a magnetic storage medium, an optical storage medium, a quantum storage medium, a mechanical computer storage medium and so forth. The memory 608 provides storage of computer readable instructions, data structures, program modules and other data for the operation of the device 404. The memory 608 may be connected to the processors 126 and/or the controller 604(1), and may store content for display on the display 406.

The memory 608 may include at least one operating system (OS) module 610. The OS module 610 is configured to manage hardware resources such as the I/O interfaces 602 and provide various services to applications or modules executing on the processors 126. Also stored in the memory 608 may be a controller management module 612, a user interface module 614, and other modules 616. The controller management module 612 is configured to provide for control and adjustment of the controller 604(1). For example, the controller management module 612 may be used to set user-defined preferences in the controller 604(1).

The user interface module 614 is configured to provide a user interface to the user. This user interface may be visual, audible, haptic, or a combination thereof. For example, the user interface module 614 may be configured to present an image or other content on the display 406 and process the inputs of applied forces 502 at particular touch zones 408 to take particular actions, such as paging forward or backward in an e-book. The user interface module 614 may be configured to respond to one or more signals from the controller 604(1). These signals may be indicative of the magnitude of an applied force, the duration of an applied force, or both within a given touch zone 408. For example, the user interface module 614 may interpret a low magnitude (light touch) on the touch zone 408(4) as a command to present on the display 406 the next page in an e-book. In comparison, in that same touch zone, a high magnitude or heavy touch on the touch zone 408(4) may be interpreted as a command to change to the next chapter. Other modules 616 may be stored in the memory 608. For example, a rendering module may be configured to process e-book files for presentation on the display 406.

The memory 608 may also include a datastore 618 to store information. The datastore 618 may use a flat file, database, linked list, tree, or other data structure to store the information. In some implementations, the datastore 618 or a portion of the datastore 618 may be distributed across one or more other devices including servers, network attached storage devices and so forth. The data store 618 may store information about one or more haptic output waveforms, user preferences, and so forth. The haptic output waveforms are configured to produce particular haptic effects when rendered by one or more of the haptic generators 604(2). Other data may be stored in the datastore 618 such as e-books, video content, audio content, graphical and/or image content, and so forth.

While the FSR assembly 102 and the controller 604(1) are shown as being used in conjunction with the processors 126 and memory 608, it is understood that the FSR assembly 102 and/or the controller 604(1) may be used in other devices which lack processors, memory, or other elements. For example, the FSR assembly 102 and/or the controller 604(1) may be used as a switch configured to control a wide variety of electronic and electro-mechanical systems including, for example, a table lamp or a kitchen appliance. The scope of the invention should therefore not be limited to the depicted implementations.

Additionally, while FIG. 6 illustrates various example components, the electronic device 404 may have additional features or functionality. For example, the device 404 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 404 may reside remotely from the device 404 in some implementations. In these implementations, the device 404 may utilize the communication interface(s) 606 to communicate with and utilize this functionality.

Figure 7:
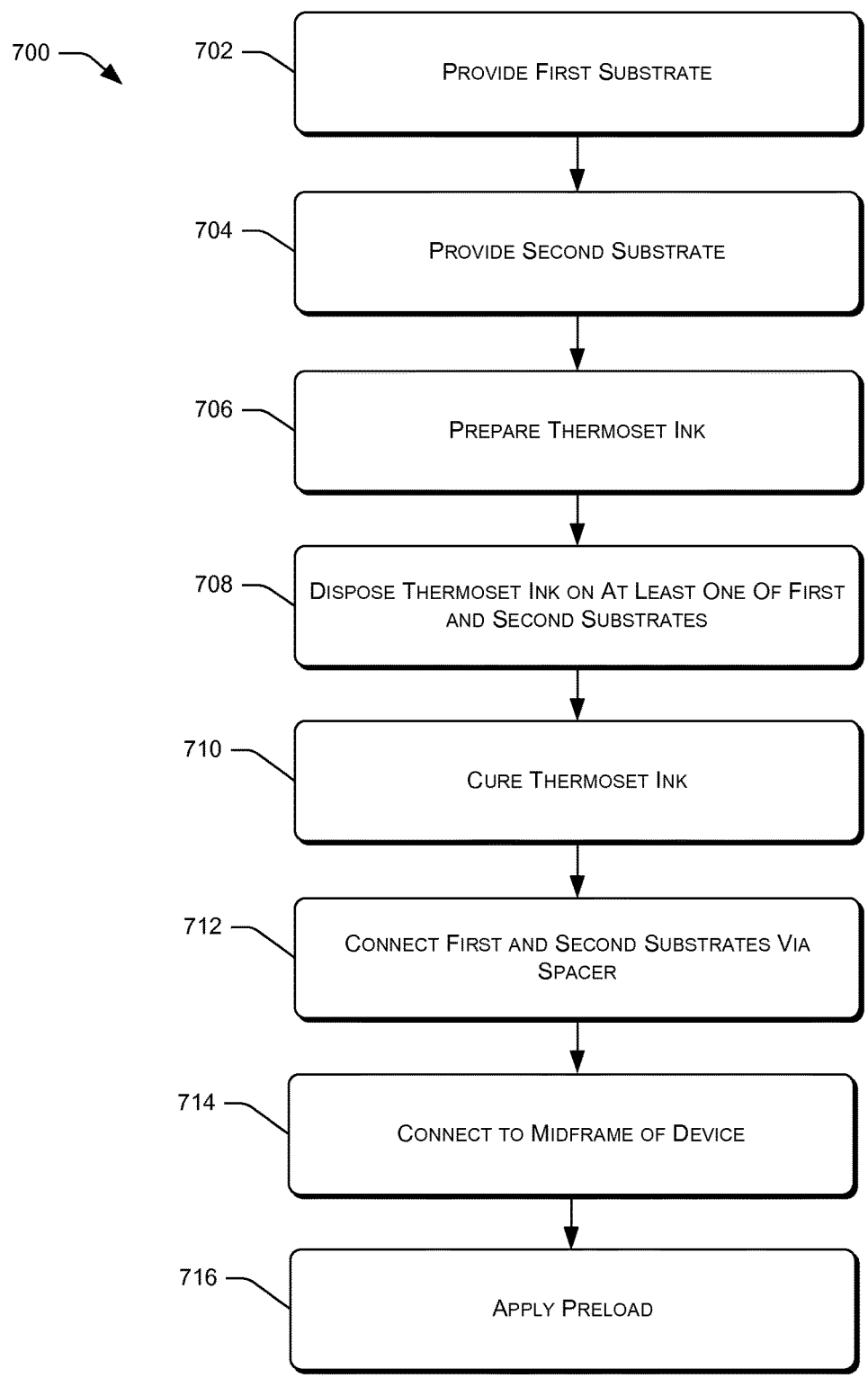
FIG. 7 shows a flow diagram illustrating an example method of manufacturing at least a portion of an electronic device including an FSR assembly.

FIG. 7 shows a flow diagram 700 illustrating an example method of manufacturing at least a portion of the electronic device 404 including the FSR assembly 102. As shown in FIG. 7, such a method may include, at 702, providing a first substrate 104. In example embodiments, the first substrate 104 may comprise a first electrically insulative substrate having a decomposition temperature greater than or equal to approximately 300° Celsius and a coefficient of thermal expansion less than or equal to approximately 30.

Such a method may also include, at 704, providing a second substrate 106. In example embodiments, the second substrate 106 may be structurally and/or functionally identical to the first substrate 104 provided at 702. For example, in some embodiments the second substrate 106 may comprise a first electrically insulative substrate having a decomposition temperature greater than or equal to approximately 300° Celsius and a coefficient of thermal expansion less than or equal to approximately 30.

Alternatively, in further embodiments, the second substrate 106 provided at 704 may have a different length, width, height, thickness, material composition, and/or other configuration that is different from a corresponding configuration of the first substrate 104. Additionally, at 702 and/or at 704 the method may include treating at least one of the first substrate 104 or the second substrate 106 via a plasma treatment and/or via a chemical treatment. Such treatments may be applied to substantially the entire substrate 102, 404, or alternatively, to discrete portions and/or surfaces of the respective substrates 104, 106. Such treatments may, for example, improve the respective adhesion characteristics of the substrates 104, 106, thereby improving the ability of one or more thermoset inks to adhere to the substrates 104, 106 during a curing process.

The method may also include, at 406, preparing a thermoset ink 108 for application to one or both of the substrates 104, 106. At 706, the thermoset ink 108 may be mixed, formulated, and/or otherwise prepared to have a desired viscosity, electrical conductivity, electrical resistance, and/or other characteristic. For example, at 706, the thermoset ink 108 may be prepared such that it has a curing temperature between approximately 150° Celsius and approximately 350° Celsius. At 706, the thermoset ink 108 may also be prepared such that it has an electrical resistance between approximately 16 k$\Omega$/mm$^2$ and approximately 29 k$\Omega$/mm$^2$. In still further embodiments, the thermoset ink 108 may be prepared such that it has an electrical resistance between approximately 100 k$\Omega$/mm$^2$ and approximately 250 k$\Omega$/mm$^2$. In an example embodiment, the thermoset ink 108 may be prepared at 706 by mixing at least one of carbon black particles and silver particles with a solvent such that the desired electrical resistance, electrical conductivity, and/or viscosity is achieved. In such embodiments, the solvent may comprise at least one of a urethane, a phenol-based resin, or an epoxy-based resin, and the thermoset ink 108 may be prepared such that the ink comprises between approximately 1 percent by weight and approximately 5 percent by weight of the solvent. Further, in such embodiments at least a portion of a remainder of the thermoset ink 108 may comprise at least one of carbon black particles or silver particles. Such particles may have any of the particle sizes described above, and the viscosity of the thermoset ink 108 prepared at 706 may be between approximately 2 centipoise and approximately 10 centipoise.

The example method described above may also include, at 708, disposing the thermoset ink 108 on at least one of the first and second substrates 104, 106. For example, the thermoset ink 108(1) may be disposed on the bottom surface B of the first substrate 104 and the thermoset ink 108(2) may be disposed on the top surface C of the second substrate 106. In example embodiments, the thermoset ink 108(1) may be disposed on substantially the entire bottom surface B, and the thermoset ink 108(2) may be disposed on substantially the entire top surface C. In other embodiments, the thermoset ink 108(1) may be disposed on at least a portion E of the bottom surface B and/or the thermoset ink 108(2) may be disposed on at least a portion F of the top surface C.

The method may further include, at 710, curing the thermoset ink 108 by at least one of elevating the temperature of the thermoset ink 108 or subjecting the thermoset ink 108 to an infrared radiation treatment. For example, the first and second substrates 104, 106 (as well as the thermoset ink 108(1), 108(2) disposed on the first and second substrates 104, 106, respectively) may be heated to approximately 150° Celsius, and the first and second substrates 104, 106 may be maintained at this elevated temperature for approximately 10 minutes in order to at least partially cure the thermoset ink 108(1), 108(2) disposed on the first and second substrates 104, 106. For example, at 710 the first and second substrates 104, 106 may be heated to between approximately 150° Celsius and approximately 250° Celsius, and the first and second substrates 104, 106 may be maintained at this elevated temperature for between approximately 10 minutes and approximately 30 minutes in order to at least partially cure the thermoset ink 108(1), 108(2).

Additionally and/or in combination, example methods may further include impinging, at 710, infrared radiation on the thermoset ink 108(1), 108(2). For example, at 710 infrared radiation having a wavelength between approximately 1.0 millimeters and approximately 750 nanometers may be impinged upon the thermoset ink 108(1), 108(2) for between approximately 3 minutes and approximately 5 minutes. In such embodiments, impinging infrared radiation on the thermoset ink 108(1), 108(2) may at least partially cure the thermoset ink 108(1), 108(2). In some embodiments, the infrared radiation described above may be impinged on the thermoset ink 108(1), 108(2) before, during, and/or after the first and second substrates 104, 106 have been heated to the elevated temperatures described above. For example, in some embodiments such infrared radiation may be impinged on the thermoset ink 108(1), 108(2) after the first and second substrates 104, 106 have been heated to between approximately 150° Celsius and approximately 250° Celsius for between approximately 10 minutes and approximately 30 minutes. In such embodiments, the first and second substrates 104, 106 may be maintained at such elevated temperatures while the infrared radiation is impinged on the thermoset ink 108(1), 108(2). In still further embodiments, the thermoset ink 108(1), 108(2) may be at least partially cured on the first and second substrates 104, 106 through infrared radiation treatment alone (i.e., without heating the first and second substrates 104, 106 to the elevated temperatures described above).

In example embodiments, such methods may also include, at 712, connecting the first and second substrates 104, 106 via a spacer 110. For example, in such embodiments the spacer 110 may be connected to the bottom surface B of the first substrate 104 as well as to the top surface C of the second substrate 106. As described above with respect to at least FIG. 2, such a spacer 110 may form at least part of a gap G between the bottom surface B of the first substrate 104 and the top surface C of the second substrate 106. In particular, such a spacer 110 may form at least part of a gap G extending between the thermoset ink 108(1) disposed on the bottom surface B of the first substrate 104 and the thermoset ink 108(1) disposed on the top surface C of the second substrate 106.

At 714, the FSR assembly 102 may be connected to the midframe 118 of the device 404. For example, a layer of PSA 112 may be applied to at least one of the bottom surface D of the second substrate 106 or the recess 120 of the midframe 118. At least the second substrate 106 of the FSR assembly 102 may then be adhered to the midframe 118 via the layer of PSA 112. It is understood that in further embodiments, the PSA 112 described above between the second substrate 106 and the midframe 118 may be omitted. In such embodiments, the FSR assembly 102 may be connected to the midframe 118 via one or more clips, pins, and/or via a compressive force applied by, for example, the exterior 208(1) and/or the preload layer 124.

In example embodiments the method may further include, at 716, providing a preload to at least a portion of the FSR assembly 102. For example, at 716 a preload layer 124 may be provided, and a force concentration layer 122 may be disposed between the preload layer 124 and the top surface A of the first substrate 104. In such embodiments, the preload layer 124 may apply a compressive preload force 204 to at least one of the first substrate 104 or the second substrate 106 while the FSR assembly 102 is at steady-state (i.e., while no force 502 is applied to, for example, the exterior 208(1)). For example, the preload layer 124 and/or the force concentration layer 122 may be compressed between the top surface A of the first substrate 104 and the exterior 208(1) to assist in providing the preload force 204. In some embodiments, such a preload force 204 may have a magnitude between approximately 100 gf and approximately 500 gf, and such a preload force 204 may cause the FSR assembly 102 to generate at least a base output signal. Such a base output signal may have a relatively low magnitude or other characteristic, and may not be indicative of, for example, a touch input. Further, as part of the example methods described herein, the FSR assembly 102 may be connected to one or more processors 126 of the device 404 such that the base output signal as well as other output signals generated by the FSR assembly 102 and indicative of a touch input may be directed to the processors 126 as noted above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the example ranges and/or values associated with the preload forces, curing temperatures, curing times, electrical resistance, electrical conductivity, decomposition temperatures, coefficients of thermal expansion, viscosities, particle size, composition, and/or other values described herein are purely exemplary. It is understood that in additional embodiments, ranges and/or values greater than or less than those described above may be employed, and the various ranges and/or values described above are by no way intended to limit the scope of the present disclosure.

The invention claimed is:

1. A force-sensitive resistor (FSR) assembly, comprising:
   a first substrate made from a polyimide material having a decomposition temperature greater than or equal to approximately 300° Celsius and a coefficient of thermal expansion less than or equal to approximately 30, the first substrate having a first top surface and a first bottom surface opposite the first top surface;

a second substrate made from the polyimide material, the second substrate having a second top surface and a second bottom surface opposite the second top surface;

a first thermoset ink disposed on a portion of the first bottom surface;

a second thermoset ink disposed on a portion of the second top surface, wherein the first substrate is positioned such that the portion of the first bottom surface faces the portion of the second top surface, and the first thermoset ink or the second thermoset ink comprising at least one of carbon black particles or silver particles; and an adhesive disposed between the first substrate and the second substrate, wherein the first thermoset ink and the second thermoset ink are disposed radially inward of the adhesive along an axis of the FSR assembly extending substantially parallel to at least one of the first bottom surface and the second top surface, and the adhesive is configured to separate the first thermoset ink from the second thermoset ink by a distance.

2. The assembly of claim 1, further comprising a plurality of conductors disposed on the second top surface, and a dielectric material disposed on at least one conductor of the plurality of conductors, the dielectric material being disposed between the adhesive and the second bottom surface.

3. The assembly of claim 1, wherein the first thermoset ink comprises carbon black particles and the second thermoset ink comprises silver particles, the assembly further including a layer of carbon material disposed between the second thermoset ink and the first thermoset ink.

4. The assembly of claim 1, the first substrate having a first thickness and the second substrate having a second thickness less than the first thickness, the carbon black particles having a particle size between approximately 70 nanometers and approximately 2 micrometers, and the silver particles having a particle size between approximately 70 nm and approximately 2 micrometers.

5. The assembly of claim 1, wherein a force concentration layer is disposed on the first top surface and a preload layer is disposed on the force concentration layer, the preload layer applying a preload force to at least the first substrate, via the force concentration layer, of between approximately 100 gram force and approximately 500 gram force in the absence of other external forces applied to the first substrate.

6. An electronic device, comprising:
a processor;
a display coupled to the processor;
memory coupled to the processor; and
a force-sensitive resistor (FSR) assembly coupled to the processor, the FSR assembly including:
a first substrate comprising an electrically insulative material, the first substrate having a first top surface and a first bottom surface opposite the first top surface,
a second substrate including the electrically insulative material, the second substrate having a second top surface and a second bottom surface opposite the second top surface,
a thermoset ink disposed between the first substrate and the second substrate; and an adhesive forming at least part of a gap extending from the first bottom surface to the second top surface, wherein the thermoset ink is disposed radially inward of the adhesive along an axis of the FSR assembly extending substantially parallel to at least one of the first bottom surface and the second top surface.

7. The electronic device of claim 6, wherein the adhesive is in contact with the at least one of the first bottom surface and the second top surface and extends substantially around a perimeter of the at least one of the first bottom surface and the second top surface.

8. The electronic device of claim 6, wherein the adhesive is radially spaced from the thermoset ink along the axis.

9. The electronic device of claim 6, wherein the thermoset ink comprises a first portion disposed on the first bottom surface and a second portion disposed on the second top surface, and wherein the first substrate is spaced from the second substrate such that the first portion is separated from the second portion by a distance.

10. The electronic device of claim 9, wherein the first substrate is configured to flex in response to application of force, and wherein flexing of the first substrate varies the distance between the first and second portions.

11. The electronic device of claim 6, wherein the thermoset ink is embedded within one of the first substrate or the second substrate.

12. The electronic device of claim 6, wherein:
the thermoset ink comprises a first thermoset ink and second thermoset ink,
a single layer of the first thermoset ink is disposed on substantially the entire first bottom surface of the first substrate, and
a single layer of the second thermoset ink is disposed on substantially the entire second top surface of the second substrate.

13. The electronic device of claim 6, the thermoset ink having one or more of:
a curing temperature between approximately 150° Celsius and approximately 350° Celsius, or
an electrical resistance between approximately 16 kΩ/mm2 and approximately 29 kΩ/mm2.

14. The electronic device of claim 13, the electrically insulative material having one or more of:
a decomposition temperature greater than or equal to approximately 300° Celsius, or
a coefficient of thermal expansion less than or equal to approximately 30.

15. The electronic device of claim 6, the thermoset ink comprising at least one of carbon black particles and silver particles, the at least one of the carbon black particles and the silver particles each having a particle size between approximately 70 nanometers and approximately 2 micrometers.

16. The electronic device of claim 6, further comprising a preload layer, and a force concentration layer disposed between the preload layer and the first top surface, the preload layer applying a preload force to at least one of the first substrate or the second substrate, via the force concentration layer, between approximately 100 gram force and approximately 500 gram force in the absence of other external forces applied to the first substrate.

17. A force sensing resistor (FSR) assembly, comprising:
a first electrically insulative substrate, the first electrically insulative substrate having a first top surface and a first bottom surface opposite the first top surface;

a second electrically insulative substrate, the second electrically insulative substrate having a second top surface and a second bottom surface opposite the second top surface;

a thermoset ink disposed on at least one of the first bottom surface or on the second top surface; and a spacer disposed at least partly between the first and second electrically insulative substrates, the spacer forming at least part of a gap extending from the first bottom surface to the second top surface, wherein the thermoset ink is disposed radially inward of the spacer along an axis of the FSR assembly extending substantially parallel to at least one of the first bottom surface and the second top surface.

18. The assembly of claim 17, wherein:

the thermoset ink comprises a first thermoset ink and a second thermoset ink different from the first thermoset ink, the first thermoset ink is disposed on the first substrate and the second thermoset ink is disposed on the second substrate, the spacer is disposed substantially around a perimeter of the least one of the first bottom surface and the second top surface, and the spacer is radially spaced from the first thermoset ink and the second thermoset ink along the axis.

19. The assembly of claim 17, further comprising:

a force concentration layer disposed on at least a portion of the first top surface; and a preload layer disposed on the force concentration layer such that the force concentration layer is disposed between the preload layer and the first top surface, the preload layer applying a preload force to at least one of the first electrically insulative substrate or the second electrically insulative substrate, via the force concentration layer.

20. The assembly of claim 17, further comprising:

a plurality of conductors disposed on the second top surface; and a dielectric material disposed on at least one conductor of the plurality of conductors such that the dielectric material is disposed between the first bottom surface and the at least one conductor.

* * * * *